O. ZACHOW.
DIFFERENTIAL GEARING.
APPLICATION FILED MAY 8, 1911.
1,023,487.
Patented Apr. 16, 1912.
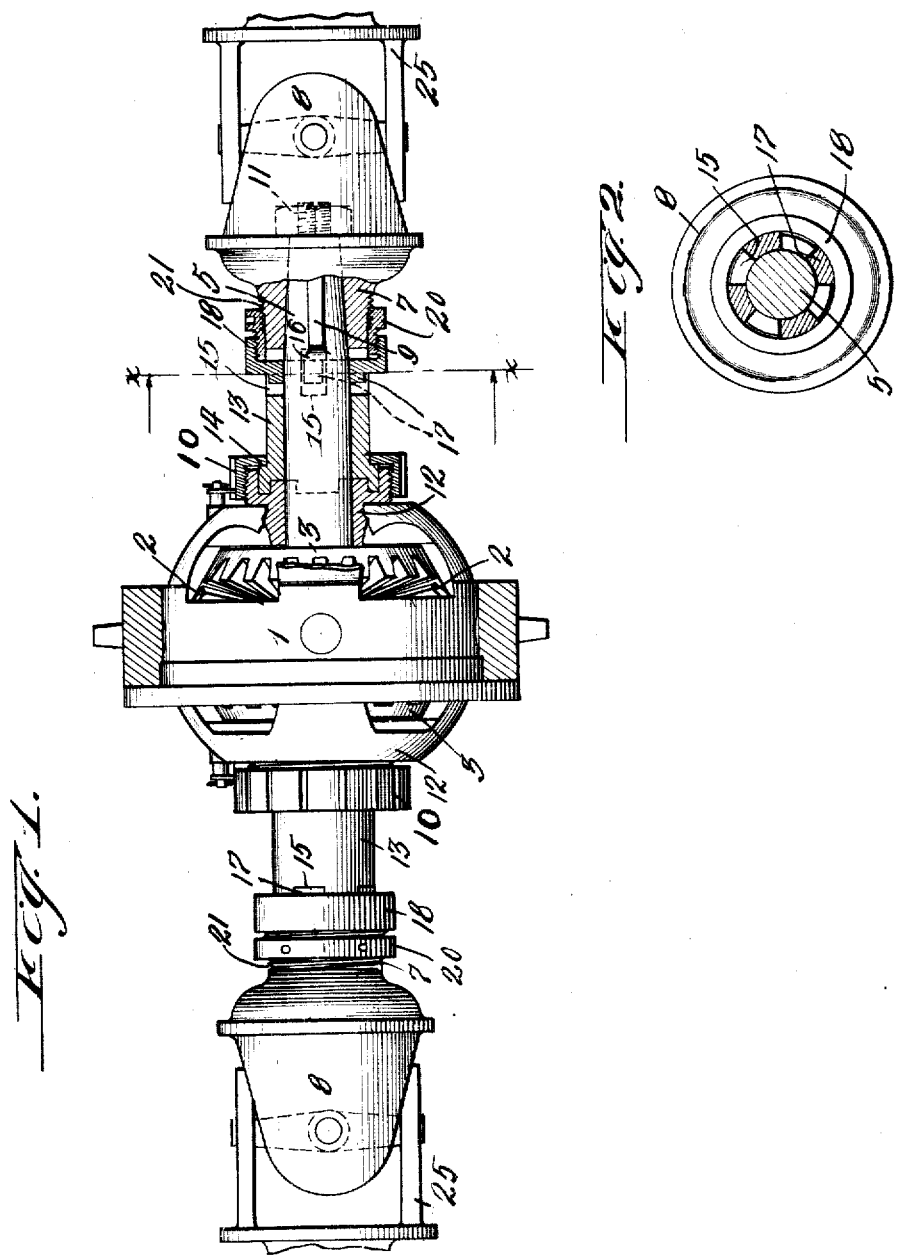

UNITED STATES PATENT OFFICE.

OTTO ZACHOW, OF CLINTONVILLE, WISCONSIN, ASSIGNOR TO FOUR WHEEL DRIVE AUTO COMPANY, OF CLINTONVILLE, WISCONSIN, A CORPORATION OF WISCONSIN.

DIFFERENTIAL GEARING.

1,023,487.     Specification of Letters Patent.     Patented Apr. 16, 1912.

Application filed May 8, 1911. Serial No. 625,674.

*To all whom it may concern:*

Be it known that I, OTTO ZACHOW, a citizen of the United States, residing at Clintonville, county of Waupaca, and State of Wisconsin, have invented new and useful Improvements in Differential Gearing, of which the following is a specification.

My invention relates to improvements in locking devices for differential gearing.

The object of my invention is to provide means whereby ordinary differential gearing, such as is usually employed in the transmission mechanism of automobiles, may be locked in such a manner as to prevent a differential or independent movement of the driven member.

The invention is particularly applicable to the main differential of a motor driven vehicle, wherein the power is applied to all of the wheels, but it may also be used on the axle differentials, or for varying the action of differential gearing in other mechanism.

In the following description, reference is had to the accompanying drawings, in which—

Figure 1 is a side elevation, part in longitudinal section, of a power transmission mechanism embodying my invention. Fig. 2 is a transverse sectional view, drawn on line x—x of Fig. 1.

Like parts are identified by the same reference characters throughout both views.

The set of differential gears illustrated, is of an ordinary type, with a driving ring member 1, a planetary set of pinions 2, internally trunnioned to the member 1, and a set of driven members 3, with which the pinions mesh on opposite sides. The driven members are each provided with a tapered shaft section 5, having a key groove 6 and adapted to receive a sleeve 7, which forms part of a knuckle joint coupling member 8, which is provided with a key 9 adapted to enter groove 6, whereby the rotary movement of the shaft section 5 may be transmitted to the knuckle joint. The shaft section 5 is secured to the coupling member 8 by a nut 11 screwed to a reduced end of the shaft section.

The driving member 1 constitutes, or is rigidly connected with, a casing which incloses the pinions and driven members. This casing is provided with sleeve members 12 embracing the shaft sections 5, and with which sleeve members 13 interlock, (the ends of the sleeves being notched and shouldered at 14, with a flanged nut 10 to hold them together). The members 13 are arranged on the shaft section 5 end to end with the sleeve members 7 of the knuckle joint coupling members 8, and the adjacent ends of these sleeves are provided with registering notches 15 and 16 in which keys 17 carried by a collar 18, are adapted to fit. When the keys 17 are engaged in both notches 15 and 16, the sleeve members 13 and 7 are locked together, but by adjusting the collar 18 to carry the keys 17 into the notches 16 only, the sleeve 7 is permitted to rotate independently of sleeve 13. When these sleeves are locked together on either side of the differential gearing, the driving member 1 of the differential is thereby rigidly connected with the sleeve 7 and coupling member 8 on that side, and independent movements of coupling member, or of the driven gear member 3 are therefore prevented. Each collar 18 is provided with an overhanging outer flange, threaded internally and adapted to receive a nut 20, which is also internally threaded in the opposite direction, and adapted to engage a threaded portion 21 on sleeve 7, so that when the nut is rotated, the collar 18 is moved longitudinally to couple or uncouple sleeve 7 from sleeve 13.

The differential gearing illustrated may constitute the main or driving differential of a motor driven vehicle in which the power is applied to all the wheels. It will therefore be understood that the transmission shafts for the front and rear axles may be connected with the outer coupling members 25, in which case it will be possible to so lock the rear (or front) wheels, or all the wheels, to the driving shaft that their motion will strictly correspond with that of the engine. If the invention is applied to the axle differentials, then either or both may be locked to the driving member of the differential, so that no variation from its speed will be permitted.

What I claim is,—

1. The combination with the driving and driven members of a set of differential gears, of shaft members rigidly connected to the respective driven members of said set, sleeve members rigidly connected to the driving member of said set, power transmitting members connected with the shaft members, and means for detachably connecting said power transmitting members with the sleeve members.

2. The combination with the driving and driven members of a set of differential gears, of shaft members rigidly connected to the respective driven members of said set, sleeve members rigidly connected to the driving member of said set, power transmitting members connected with the shaft members, and means for detachably connecting said power transmitting members with the sleeve members, said connecting means comprising collars engaged in notches in the respective power transmitting members, and movable longitudinally to also engage in notches in the sleeve members.

3. The combination with differential gearing of shaft sections rigidly connected with the driven members thereof, sleeve members on the shaft sections rigidly connected with the differential driving member, and notched at their outer ends, power transmitting sleeve members splined to the respective shaft sections and having notches registering with those of the first mentioned sleeve members, collars having internal keys engaging in the notches of the power transmitting sleeve members, and movable into the notches of the other sleeve members, and means for adjusting said collars to move their keys into and out of the notches in the first mentioned sleeve members.

4. The combination with differential gearing, of shaft sections rigidly connected with the driven members thereof, sleeve members on the shaft sections rigidly connected with the differential driving member, and notched at their outer ends, power transmitting sleeve members splined to the respective shaft sections and having notches registering with those of the first mentioned sleeve members, collars having internal keys engaging in the notches of the power transmitting sleeve members, and movable into the notches of the other sleeve members, and means for adjusting said collars to move their keys into and out of the notches in the first mentioned sleeve members, said collar adjusting means comprising a set of flanged nuts having right and left hand threaded engagement with the collars and power transmitting sleeves respectively.

In testimony whereof I affix my signature in the presence of two witnesses.

OTTO ZACHOW.

Witnesses:
H. B. ANNABLE,
W. A. OLEN.